Oct. 25, 1927.

W. B. BURGESS 1,646,443

COMPENSATOR FOR RADIO COMPASSES

Filed March 11, 1921      2 Sheets-Sheet 1

Inventor
Warren B. Burgess

By
Attorney

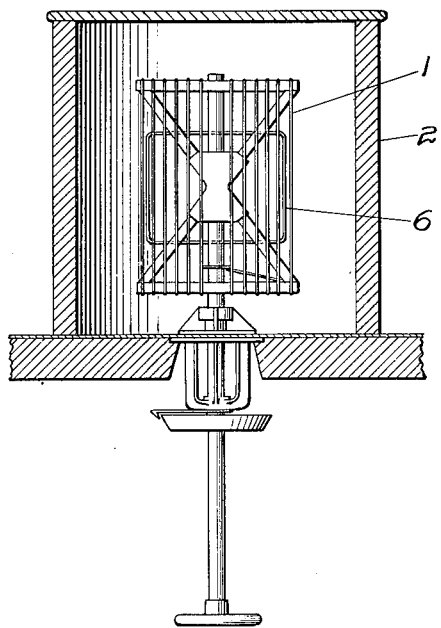

Patented Oct. 25, 1927.

1,646,443

UNITED STATES PATENT OFFICE.

WARREN B. BURGESS, OF BOSTON, MASSACHUSETTS.

COMPENSATOR FOR RADIOCOMPASSES.

Application filed March 11, 1921. Serial No. 451,571.

My invention relates to improvements in compensators for radio compasses and an object thereof is to provide means by which the electromagnetic waves may be apparently deviated to thereby neutralize the effect caused by local objects.

It is well known that the radio compass or direction finder does not give true bearings due to the electromagnetic waves being apparently deviated from their true course by local influence, an excellent example being a radio compass located on a steel ship, and it is therefore necessary that deviation curves be prepared showing the correction to be applied for each reading of the compass. I have discovered that by installing one or more loops adjacent to the compass the deviation may be neutralized to a great extent, so that the corrections given by the deviation curve would be zero, or at least very small.

My invention will be clearly understood from the following detailed description, reference being had to the accompanying drawings in which:

Fig. 5 is a side elevation of the construction shown in Fig. 4.

It is not my intention to be limited to loops of any particular size or number of turns, or to any number of loops or to their arrangement with respect to the compass coil, as I claim broadly the combination of a correcting or compensating loop or electric circuit with any type of radio direction finder or compass so located as to have the direction of propagation of the electro-magnetic waves suffer an apparent distortion or deviation, and the particular constructions which I have illustrated and will now describe in detail, are to be considered merely as examples of many possible constructions.

Figure 1:
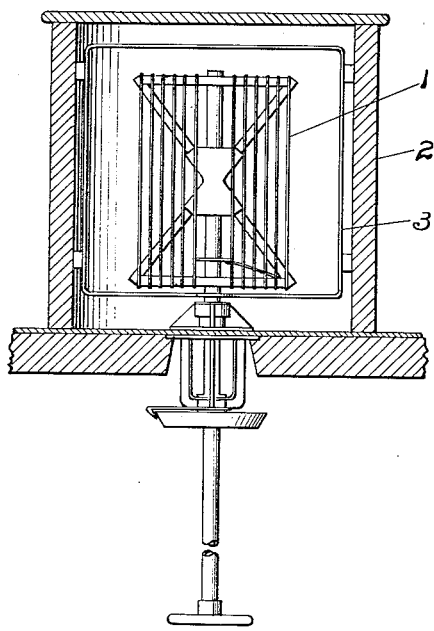
Fig. 1 is a side elevation of any conventional type of radio compass with a single loop associated therewith.
Figure 2:
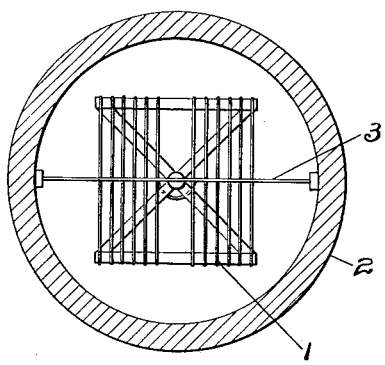
Fig. 2 is a plan view thereof.

With reference to Fig. 1, numeral 1 refers generally to a radio compass or direction finder which will not be particularly described herein as it is of any well known construction. Numeral 2 indicates the usual coil house enclosing the compass coil. Mounted within this housing is a closed loop 3 having its plane passing through the axis of rotation of the compass coil. The loop may be supported in any desired manner and is large enough to permit the compass coil to rotate within it. Fig. 2 clearly shows the position of the loop with relation to the compass coil, and in a shipboard installation the loop's plane would preferably be substantially in the center line of the ship, though of course the exact angular position of the loop would vary with conditions encountered.

Figure 3:
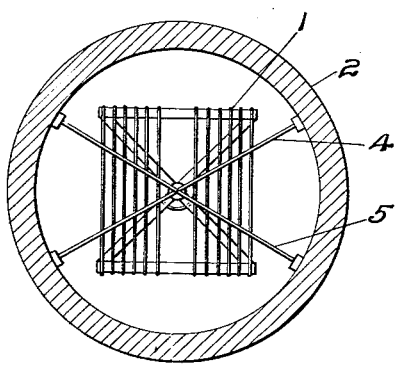
Fig. 3 is a plan view showing an arrangement employing two loops.

In Fig. 3 I show two loops 4 and 5 angularly arranged, the planes of both loops passing through the center of rotation of the compass coil. If the angle between the loops is 90° they neutralize each other and if they are parallel the effects add, while intermediate positions will give any desired degree of compensation. It will be understood that in this arrangement the resultant of the two loops bisects the angle between them. While a single loop gives an approximately sinusoidal compensation, the multiple loop arrangement gives a materially flattened curve, showing that it is possible by various loop arrangements to compensate deviations other than sinusoidal in form.

Figure 4:
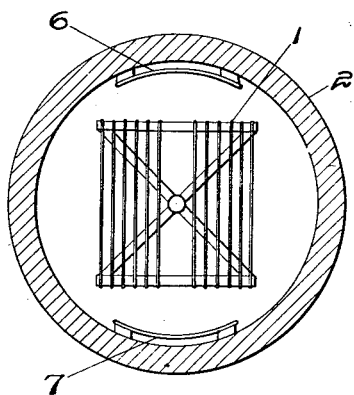
Fig. 4 is a plan view showing two small oppositely arranged loops.

In Fig. 4 I show a construction employing two small loops 6 and 7, the loops being arranged on opposite sides of the compass coil. These loops may, of course, be varied in size, relative position or electrical constants. A side view of this construction is shown in Fig. 5.

In the above examples the loop or loops have been shown as mounted in the coil house, but obviously, the loop or loops could be arranged outside, though this is not the preferable construction, as it would probably give trouble in mechanical upkeep.

My invention contemplates neutralizing the effects due to the non-horizontal approach of the wave, or to a leaning wave front. One or more closed loops may be used for this purpose, in which case the plane of the loop or loops will be arranged at an angle to the axis of rotation of the compass coil.

The method of employing a compensator of this kind would in general be as follows: It is practically universal practice to employ the null method of determining direction with radio coils; that is by turning the coil until its plane is at right angles to the direction of propagation of the incoming electromagnetic wave and the signal vanishes, this point being much more sharply defined than is the point of maximum signal, or when the plane of the coil is in line with the direction of propagation. Radio compass stations furnishing accurate bearings are carefully calibrated by having a radio transmitting station, (usually a ship when calibrating a shore compass station), within sight of the compass station send signals, the bearing being simultaneously observed on the radio compass and with a theodolite, and the deviation obtained by comparing the two observations, the process being repeated for a number of positions of the transmitting station in a given sector. Now with a compensating coil as herein described, instead of letting the deviation remain in the compass, the compensating coil is adjusted until the deviation disappears or nearly so, and then a number of comparative observations taken to note any residual deviation, as is the practice in compensating the well known mariner's magnetic compass.

It is to be understood that wherever the term radio compass is employed herein, it is intended to mean any radio direction finder.

It is also to be understood that the term closed loop as used herein includes not only loops directly closed, but also those that are closed by capacity.

Having fully described my invention, what I claim as new and desire to secure by Letters Patent is:

1. In combination with a radio compass coil subject to deviational characteristics of direction, means for reducing the effect of the deviational characteristics of the radio compass coil to a minimum, the means consisting of a coil mounted coaxially with said radio compass coil and in inductive relation thereto.

2. In combination with a radio compass coil subject to deviational characteristics of direction, means for reducing the effect of the deviational characteristics of the radio compass coil to a minimum, the means consisting of a closed coil mounted coaxially with and surrounding the radio compass coil and in inductive relation thereto, the inherent coupling between the coils due to their positional relation serving as the only means for the transfer of energy between the coils.

3. In combination with a radio compass coil subject to deviational characteristics of direction, means for reducing the effect of the deviational characteristics of the radio compress coil to a minimum, the means consisting of a plurality of closed coils mounted coaxially with and surrounding the radio compass coil and in inductive relation thereto, the inherent coupling between the coils due to their positional relation serving as the only means for the transfer of energy between the coils.

4. In combination with a radio compass coil subject to deviational characteristics of direction, means for reducing the effect of the deviational characteristics of the radio compass coil to a minimum, the means consisting of a plurality of coils mounted coaxially with and surrounding the radio compass coil and in inductive relation thereto, the inherent coupling between the coils due to their positional relation serving as the only means for the transfer of energy between the coils.

5. In combination with a radio compass coil subject to deviational characteristics of direction, means for reducing the effect of the deviational characteristics of the radio compass coil to a minimum, the means consisting of a closed coil mounted coaxially with and surrounding the radio compass coil and movable relative thereto, the inherent coupling between the coils due to their positional relation serving as the only means for the transfer of energy between the coils.

6. In combination with a radio compass coil subject to deviational characteristics of direction, means for reducing the effect of the deviational characteristics of the radio compass coil to a minimum, the means consisting of a plurality of coils mounted coaxially with and surrounding the radio compass coil and movable relative thereto, the inherent coupling between the coils due to their positional relation serving as the only means for the transfer of energy between the coils.

7. In combination with a radio compass coil subject to deviational characteristics of direction, means for reducing the effect of the deviational characteristics of the radio compass coil to a minimum, the means consisting of a plurality of closed coils mounted coaxially with and surrounding the radio compass coil and movable relative thereto, the inherent coupling between the coils due to their positional relation serving as the only means for the transfer of energy between the coils.

8. In combination with a radio compass coil subject to deviational characteristics of direction, means for reducing the effect of the deviational characteristics of the radio compass coil to a minimum, the means consisting of a coil mounted in close proximity thereto, the radio compass coil serving as a secondary for the said means.

WARREN B. BURGESS.